United States Patent
Prakash et al.

(10) Patent No.: US 12,372,410 B2
(45) Date of Patent: Jul. 29, 2025

(54) FLAME DETECTOR LENS MAINTENANCE SYSTEM

(71) Applicant: General Electric Company, Schenectady, NY (US)

(72) Inventors: Rajan Prakash, Bangalore (IN); Anil Kumar Dasoji, Bangalore (IN); Lawrence Melville Danner, Greenville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 249 days.

(21) Appl. No.: 17/937,605

(22) Filed: Oct. 3, 2022

(65) Prior Publication Data
US 2023/0111717 A1  Apr. 13, 2023

(30) Foreign Application Priority Data
Oct. 7, 2021 (IN) .............................. 202111045717

(51) Int. Cl.
*G01J 5/05* (2022.01)
*F02C 9/18* (2006.01)
(Continued)

(52) U.S. Cl.
CPC ................ *G01J 5/051* (2022.01); *F02C 9/18* (2013.01); *G01J 5/0088* (2013.01);
(Continued)

(58) Field of Classification Search
CPC . G01J 5/05; G01J 5/051; G01J 5/0088; F02C 6/06; F02C 6/08; F02C 7/264;
(Continued)

(56) References Cited

U.S. PATENT DOCUMENTS 3,775,975 A * 12/1973 Stenger ................... F02C 7/232
                                                        60/798
4,650,318 A *  3/1987 Pointer ................ G01J 5/0088
                                                        356/43
(Continued)

FOREIGN PATENT DOCUMENTS

JP      H06317181 A     11/1994
JP      H09133023 A      5/1997

OTHER PUBLICATIONS

Extended European Search Report from EP Application No. 22196412.5 dated Feb. 24, 2023, 8 pages.

*Primary Examiner* — Alain Chau
(74) *Attorney, Agent, or Firm* — James Pemrick; Charlotte Wilson; Hoffman Warnick LLC

(57) ABSTRACT

A maintenance system for a flame detector in an enclosure for an industrial machine, such as turbomachine, is disclosed. The maintenance system may include a conduit having an inlet at an exterior of the enclosure and an outlet at an interior of the enclosure. The outlet is adjacent the flame detector. The maintenance system also includes a source of air and a valve fluidly coupling the inlet of the conduit and the source of air. The valve is configured to deliver a compressed air from the source of air through the outlet of the conduit onto a surface of the flame detector, thereby removing contaminants from the surface and/or cooling the surface. A controller can be provided to automatically operate the cleaning and cooling system when a fault signal is observed.

20 Claims, 6 Drawing Sheets

(51) Int. Cl.
  *G01J 5/00* (2022.01)
  *G02B 27/00* (2006.01)

(52) U.S. Cl.
  CPC ...... *G02B 27/0006* (2013.01); *F05D 2260/02* (2013.01); *F05D 2260/201* (2013.01); *F05D 2260/607* (2013.01); *F05D 2270/303* (2013.01); *F05D 2270/804* (2013.01)

(58) Field of Classification Search
  CPC ..... F02C 7/00; F02C 7/04; F02C 7/20; G01N 2021/151; B64D 2045/009; F23N 2229/18; F23R 3/002
  See application file for complete search history.

(56) References Cited

U.S. PATENT DOCUMENTS

| | | | | |
|---|---|---|---|---|
| 4,709,155 A * | 11/1987 | Yamaguchi | ........... | G01J 5/0846 431/79 |
| 4,835,525 A * | 5/1989 | Egi | ........... | F23N 5/082 250/554 |
| 4,836,689 A * | 6/1989 | O'Brien | ........... | G01J 5/0806 359/509 |
| 5,180,227 A * | 1/1993 | John | ........... | G01J 5/0088 374/135 |
| 5,241,148 A | 8/1993 | Kondoh et al. | | |
| 6,053,987 A | 4/2000 | Tanimura et al. | | |
| 6,141,957 A * | 11/2000 | Tsukagoshi | ........... | F23M 11/045 60/803 |
| 8,439,630 B2 * | 5/2013 | Lemieux | ........... | F01D 21/003 415/118 |
| 11,339,679 B1 * | 5/2022 | Lefebvre | ........... | F01D 17/02 |
| 2004/0060576 A1 * | 4/2004 | Cronin | ........... | G01N 21/15 423/598 |
| 2005/0067588 A1 * | 3/2005 | Horikawa | ........... | G01J 5/02 250/573 |
| 2009/0191494 A1 * | 7/2009 | Galfrascoli | ........... | F23N 5/082 431/13 |
| 2009/0229811 A1 * | 9/2009 | Schmitt | ........... | G01J 5/0014 165/96 |
| 2014/0013768 A1 * | 1/2014 | Laing | ........... | F02C 7/20 60/796 |
| 2016/0273401 A1 * | 9/2016 | Ekanayake | ........... | F01K 23/10 |
| 2016/0320292 A1 | 11/2016 | Stamer | | |
| 2017/0171418 A1 * | 6/2017 | Zhao | ........... | H04N 1/00103 |
| 2021/0404392 A1 * | 12/2021 | Castellaw | ........... | F02C 9/40 |

* cited by examiner

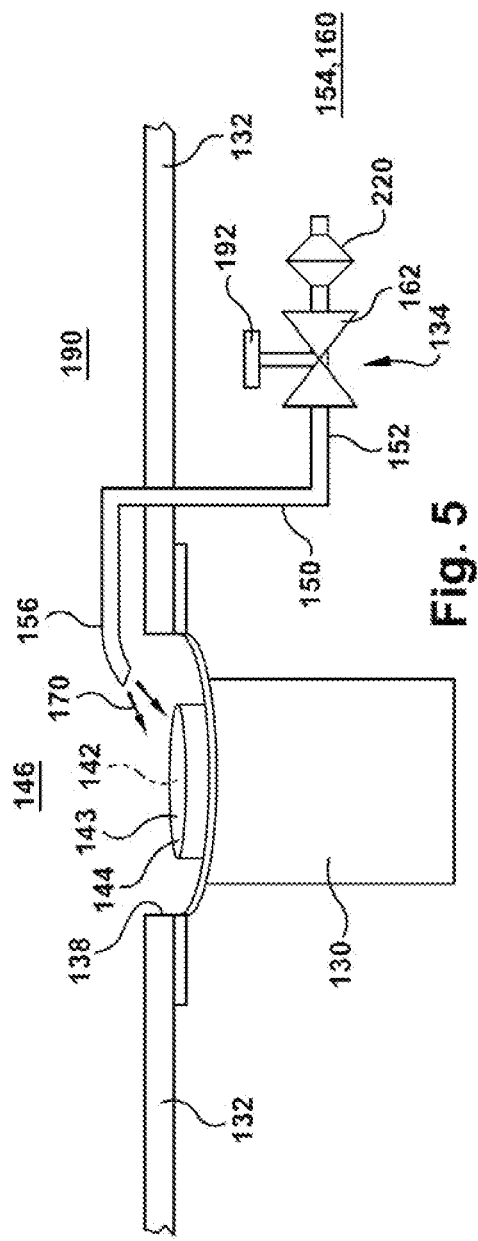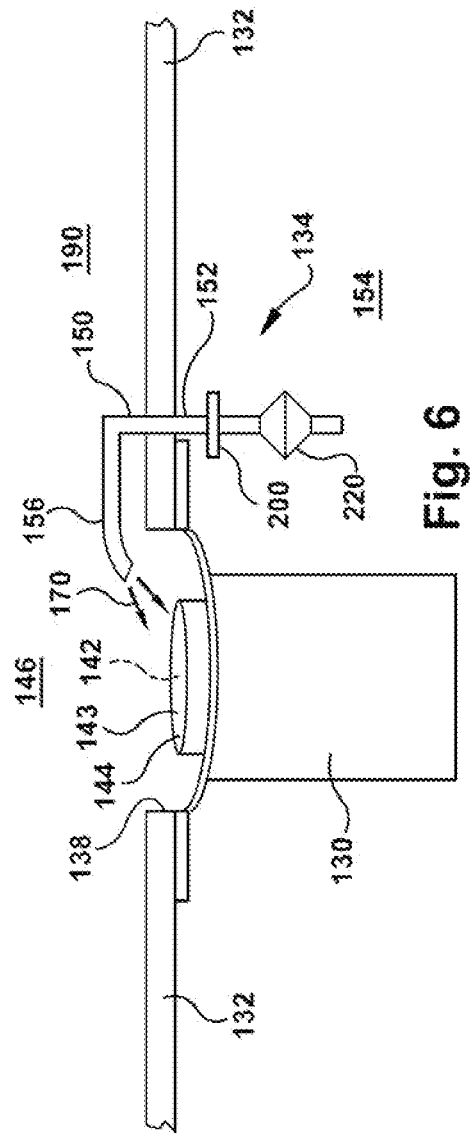

FLAME DETECTOR LENS MAINTENANCE SYSTEM

CROSS-REFERENCE TO RELATED APPLICATIONS

This application claims priority pursuant to 35 U.S.C. 119(a) to Indian Application No. 202111045717, filed Oct. 7, 2021, which application is incorporated herein by reference in its entirety.

TECHNICAL FIELD

The disclosure relates generally to flame detectors and, more particularly, to a maintenance system for cleaning and/or cooling a lens of a flame detector for a turbomachinery application.

BACKGROUND

In certain industrial machines, infrared or ultraviolet flame detectors or sensors are typically used for the early detection of fire within an enclosure of the machine. For example, turbomachines such as gas turbine systems use flame detectors for the early detection of fire within an enclosure of the gas turbine system. The environment within the enclosures of these industrial machines can be hot, harsh, and dirty. Despite this environment, the lenses of these sensors must be kept clean and within an allowed temperature limit for accurate operation.

BRIEF DESCRIPTION

All aspects, examples and features mentioned below can be combined in any technically possible way.

An aspect of the disclosure provides a maintenance system for a flame detector located on an enclosure of a turbomachine area, the maintenance system comprising: a first conduit having an inlet at an exterior of the enclosure and an outlet at an interior of the enclosure, the outlet adjacent the flame detector; a source of air; and a valve fluidly coupling the inlet of the first conduit and the source of air, wherein the valve is configured to deliver a compressed air from the source of air through the outlet of the first conduit onto a surface of the flame detector, thereby removing contaminants from the surface and/or cooling the surface.

Another aspect of the disclosure includes any of the preceding aspects, and the valve includes a solenoid valve, and further comprising a controller operatively coupled to the flame detector and the solenoid valve, wherein the controller operates the solenoid valve to deliver the compressed air from the outlet of the first conduit onto the surface of the flame detector in response to a fault signal.

Another aspect of the disclosure includes any of the preceding aspects, and the source of air includes air from a compressor, and the valve is fluidly coupled to a second conduit delivering instrument air from the interior of the enclosure.

Another aspect of the disclosure includes any of the preceding aspects, and the source of air includes ambient surroundings of the enclosure, and wherein the enclosure has a negative pressure therein to create the compressed air from ambient air drawn into the first conduit through the valve.

Another aspect of the disclosure includes any of the preceding aspects, and the valve is a manually operable valve.

Another aspect of the disclosure includes any of the preceding aspects, wherein the valve is a manually operable valve, the source of air includes air from a compressor, and the valve is fluidly coupled to a second conduit delivering the instrument air from the interior of the enclosure.

Another aspect of the disclosure includes any of the preceding aspects, wherein the valve is a manually operable valve, and the source of air includes ambient surroundings of the enclosure; and wherein the enclosure has a negative pressure therein to create the compressed air from ambient air drawn into the first conduit through the valve.

Another aspect of the disclosure includes any of the preceding aspects, and the outlet of the first conduit includes at least one nozzle thereon.

Another aspect of the disclosure includes any of the preceding aspects, and the valve is positioned at the exterior of the enclosure.

Another aspect of the disclosure relates to a maintenance system for a flame detector on an enclosure of a turbomachine area, the maintenance system comprising: a conduit having an inlet at an exterior the enclosure and an outlet at an interior of the enclosure, the outlet adjacent the flame detector; and a metering orifice on the inlet of the conduit, wherein the enclosure has a negative pressure therein to create a compressed air from ambient air drawn into the metering orifice, and wherein the compressed air exits through the outlet of the conduit onto a surface of the flame detector, thereby removing contaminants from the surface and/or cooling the surface.

Another aspect of the disclosure includes any of the preceding aspects, and the outlet of the conduit includes at least one nozzle thereon.

Another aspect includes a system, comprising: a gas turbine (GT) system including: a compressor, a combustor assembly, and a gas turbine operatively coupled to the compressor and the combustor assembly; an enclosure for the GT system; a flame detector operatively coupled to the enclosure; and a maintenance system for the flame detector, the maintenance system including: a first conduit having an inlet at an exterior of the enclosure and an outlet at an interior of the enclosure, the outlet adjacent the flame detector; a source of air; and a valve fluidly coupling the inlet of the first conduit and the source of air, wherein the valve is configured to deliver a compressed air from the source of air through the outlet of the first conduit onto a surface of the flame detector, thereby removing contaminants from the surface and/or cooling the surface.

Another aspect of the disclosure includes any of the preceding aspects, and the valve includes a solenoid valve, and further comprising a controller operatively coupled to the flame detector and the solenoid valve, wherein the controller operates the solenoid valve to deliver the compressed air from the outlet of the first conduit onto the surface of the flame detector in response to a fault signal.

Another aspect of the disclosure includes any of the preceding aspects, and the source of air includes air from the compressor, and the valve is fluidly coupled to a second conduit delivering instrument air from the interior of the enclosure.

Another aspect of the disclosure includes any of the preceding aspects, and the source of air includes ambient surroundings of the enclosure, and wherein the enclosure has a negative pressure therein to create the compressed air from ambient air drawn into the first conduit through the valve.

Another aspect of the disclosure includes any of the preceding aspects, and the valve is a manually operable valve.

Another aspect of the disclosure includes any of the preceding aspects, and the source of air includes the compressor, and the valve is fluidly coupled to a second conduit delivering instrument air from the interior of the enclosure.

Another aspect of the disclosure includes any of the preceding aspects, wherein the valve is a manually operable valve, and the source of air includes ambient surroundings of the enclosure; and wherein the enclosure has a negative pressure therein to create the compressed air from ambient air drawn into the first conduit through the valve.

Another aspect of the disclosure includes any of the preceding aspects, and the outlet of the first conduit includes at least one nozzle thereon.

Another aspect of the disclosure includes any of the preceding aspects, and the valve is positioned at the exterior of the enclosure.

Two or more aspects described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 5 shows a schematic view of a maintenance system for a flame detector, according to yet other embodiments of the disclosure.

FIG. 6 shows a schematic view of a maintenance system for a flame detector, according to more embodiments of the disclosure.

Figure 1:
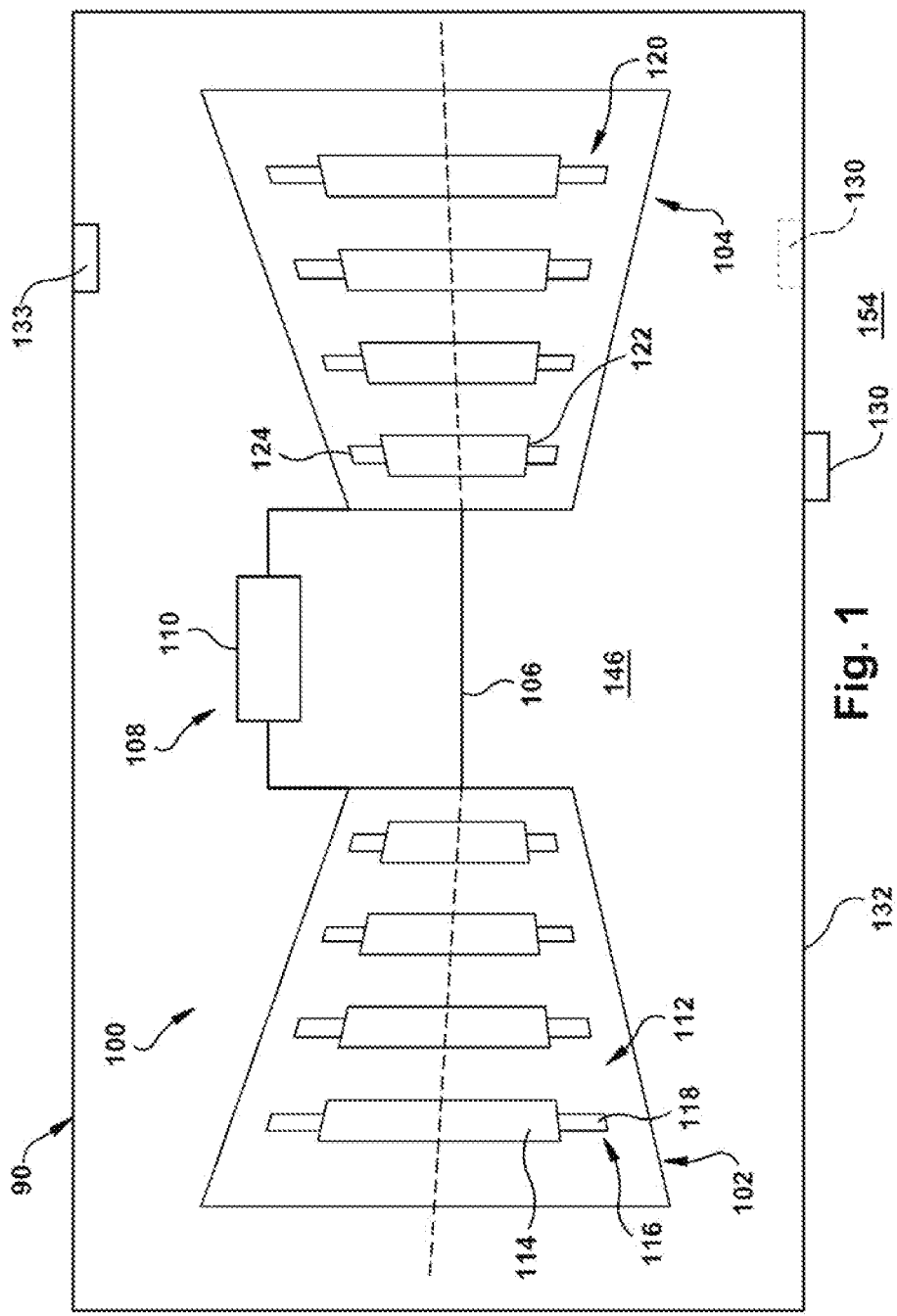
FIG. 1 shows a schematic view of an illustrative turbomachine including a cleaning system for a flame detector on an enclosure of the turbomachine, according to embodiments of the disclosure.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the subject matter of the current disclosure, it will become necessary to select certain terminology when referring to and describing relevant machine components within, for example, turbomachine such as a gas turbine system. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur or that the subsequently described component or element may or may not be present, and that the description includes instances where the event occurs or the component is present and instances where it does not or is not present.

Where an element or layer is referred to as being "on," "engaged to," "connected to" or "coupled to" another element or layer, it may be directly on, engaged to, connected to, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As indicated above, the disclosure provides a maintenance system for a flame detector on an enclosure of, for example, a turbomachine. In certain embodiments, the maintenance system may include a conduit having an inlet at an exterior of the enclosure and an outlet at an interior of the enclosure. The outlet is adjacent the flame detector. The maintenance system also includes a source of air, and a valve fluidly coupling the inlet of the conduit and the source of air. The valve is configured to deliver a compressed air from the source of air through the outlet of the conduit onto a surface of the flame detector, thereby removing contaminants from the surface. A controller can be provided to automatically operate the maintenance system when a fault signal is observed. The maintenance system can be used to clean and/or to cool the lens of the flame detector; hence, while referred to as a 'cleaning system' herein for brevity, it may also be referenced herein as a 'cleaning and cooling system'. The maintenance system is easy to install on any system, and the valve of the maintenance system is readily accessible from outside the system.

FIG. 1 shows a schematic view of an illustrative system 90 including a turbomachine in the form of a gas turbine (GT) system 100 within an enclosure 132 according to embodiments of the disclosure. Enclosure 132 can include any form of barrier for sealing off an area. Ventilation fan(s) 133 can pull air from enclosure 132. While a GT system 100 will be described as an illustrative setting, it is emphasized that the teachings of the disclosure are applicable to a wide variety of industrial machines including other turbine systems and a wide variety of other devices such as pump skids, combustion engines, and other devices in which flame detection is desired.

FIG. 1 shows GT system 100 including a compressor 102 operatively coupled to a turbine 104 through a shared compressor/turbine shaft 106. Compressor 102 is also fluidly connected to turbine 104 through a combustor assembly 108. Hence, turbine 104 is operatively coupled to compressor 102 and combustor assembly 108. Combustor assembly 108 may include any now known or later developed combustor(s) 110 such as, but not limited to, a can annular combustor system including several can combustors in an annular array about the shaft 106 or an annular combustor system. Hence, combustor assembly 108 may be mounted to GT system 100 in a wide range of configurations including, but not limited to, being arranged in a can-annular array. Compressor 102 includes a plurality of compressor rotor wheels 112. Rotor wheels 112 include a first stage compressor rotor wheel 114 having a plurality of first stage compressor rotor blades 116 each having an associated airfoil portion 118. Stationary blades (not shown) within compressor 102 can direct air through compressor 102 against compressor rotor blades 116 of compressor 102. Similarly, turbine 104 includes a plurality of turbine rotor wheels 120 including a first stage turbine wheel 122 having a plurality of turbine blades 124, e.g., provided as first stage turbine rotor blades. Stationary blades (not shown) within turbine 104 can direct gases through turbine 104 against turbine blades 124 of turbine 104.

A flame detector 130 identifies the presence of a flame. As shown in FIG. 1, flame detector 130 may be employed in one or more locations looking into an interior 146 of enclosure 132 (two shown, one in dashed lines, but could be one or more than two). For example, flame detector 130 may be operatively coupled on enclosure 132 from outside or inside to determine the presence of a flame due to various reasons such as, but not limited to, leakage of a gas turbine fuel system. Flame detector 130 may include any now known or later developed infrared or ultraviolet flame light detectors.

Figure 2:
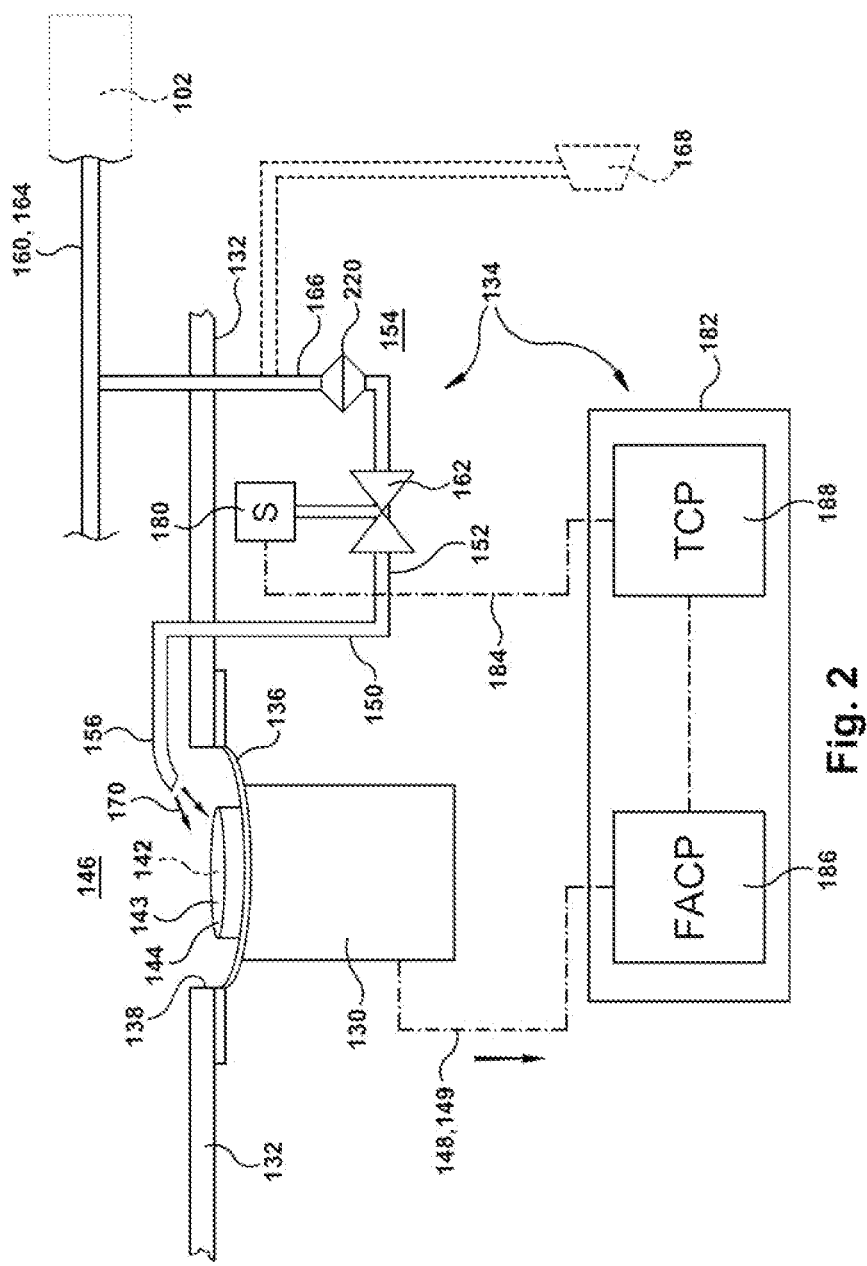
FIG. 2 shows a schematic view of a maintenance system for a flame detector, according to embodiments of the disclosure.

FIG. 2 shows a schematic view of a maintenance system 134 for cleaning and/or cooling flame detector 130 for GT system 100 (FIG. 1) according to embodiments of the disclosure. In FIG. 2, flame detector 130 is illustrated on an outside of enclosure 132 and looking into interior 146 through an opening 138. Hence, in certain embodiments, flame detector 130 is positioned on enclosure 132 from outside, i.e., it extends outwardly from the outside of enclosure 132. As will be described herein, flame detector 130 may alternatively be mounted inside enclosure 132, see e.g., FIG. 8. Flame detector 130 may be mounted using any now known or later developed mounting system 136 such as, but not limited to, a mounting flange.

During operation, contaminants 142 may accumulate on a surface 143 of a lens(es) 144 of flame detector 130 that is directed into interior 146 of enclosure 132 in which a flame is anticipated. In most drawings, lens 144 is shown as a singular element, but it may include several lenses 144 (see e.g., FIG. 7), all of which may be cleaned using maintenance system 134 described herein. Contaminants 142 may include dirt, soot, or any other material that may cause a fault of flame detector 130, such as inoperability (e.g., loss of field of view) or other non-optimal operation thereof (e.g., lack of clear view). Where contaminants 142 create a fault of flame detector 130, flame detector 130 may create a fault signal 148 indicative of the fault's presence. Alternatively, or in addition to the above-described scenario, flame detector 130 may also create fault signal 148 where it is overheating and requires cooling (using maintenance system 134). Flame detector 130 may generate fault signal 148 indicative of overheating or may send a temperature signal 149 that is used by a controller 182 to determine whether a fault is observed and to deliver compressed air 170 to cool lens(es) 144, e.g., by determining whether the temperature is above a desired temperature. In this latter case, controller 182 generates the fault signal.

Maintenance system 134 may include a conduit 150 (first conduit) having an inlet 152, as shown in this example, at an exterior 154 of enclosure 132, and an outlet 156 at interior 146 of enclosure 132. Conduit 150 may pass through enclosure 132 in a sealed manner via any now known or later developed fashion.

Maintenance system 134 also includes a source of air 160. Source of air 160 is a continuous source of air, indicating the air flow is not intermittent as would be the case where structures other than a valve 162, described herein, may be present. In certain embodiments, source of air 160 can be some form of a compressor 102, 168. For example, as shown in FIG. 1, source of air 160 can include an instrument air 164 from, for example, compressor 102 of GT system 100. Instrument air 164 may be obtained from any location within GT system 100, e.g., a plenum of combustor(s) 110 (not shown). In other embodiments, an independent compressor 168 (shown in dashed lines) may be source of air 160. Independent compressor 168 may be inside or outside of enclosure 132. In yet other embodiments, as will be described, source of air 160 may be ambient surroundings of enclosure 132, i.e., exterior 154 of enclosure 132.

Continuing with FIG. 2, maintenance system 134 may also include valve 162 fluidly coupling inlet 152 of conduit 150 and source of air 160. Valve 162, regardless of form, is positioned at exterior 154 of enclosure 132, making it readily accessible from outside of GT system 100 in this example application. In FIG. 2, source of air 160 includes a conduit 166 (second conduit) extending from interior 146 of enclosure 132 to valve 162 in a sealed manner. Valve 162 is fluidly coupled to conduit 166 for delivering instrument air 164 to interior 146 of enclosure 132. Valve 162 is configured to deliver a compressed air 170 from source of air 160 through outlet 156 of conduit 150 onto surface(s) 143 of flame detector 130, e.g., of lens(es) 144, to clean and/or cool surface(s) 143. Compressed air 170 has sufficient force to remove enough contaminants 142 from surface(s) 143 and/ or to cool lens(es) 144 to, e.g., alleviate issues that may be causing fault signal 148 or other issues. Compressed air 170 also has temperature and flow rate to cool surface(s) 143 of lens(es) 144 or other parts of flame detector 130. As will described relative to FIG. 7, outlet 156 may be branched into any number of openings to clean any number of surfaces 143 and/or lenses 144 used.

In FIG. 2, valve 162 includes a solenoid valve 180. Solenoid valve 180 may include any now known or later developed electrically operable valve. Maintenance system 134 may also include a controller 182 operatively coupled to flame detector 130 and solenoid valve 180. Controller 182 operates solenoid valve 180 to deliver compressed air 170 from outlet 156 of conduit 150 onto surface 143 of flame detector 130 in response to fault signal 148. That is, compressed air 170 is delivered to clean and/or cool surface 143 when flame detector 130 has a fault. Controller 182 sends an operation signal 184 to open or close solenoid valve 180 as appropriate. Otherwise, compressed air 170 is not delivered to surface 143.

Controller 182 can take a variety of forms. For example, in FIG. 2, controller 182 may include part(s) of a fire alarm control panel (FACP) 186 and a turbine control panel (TCP) 188. In alternative embodiments, controller 182 may be a free-standing controller. In any event, controller 182 includes any electronic control device(s) and/or logic capable of operating solenoid valve 180, as described herein. Fault signal 148 and operation signal 184 may be communicated in any fashion, e.g., through wires or wirelessly. The duration that compressed air 170 is directed toward or onto or across surface 143 can be user defined, e.g., a set time interval, until fault signal 148 is alleviated, etc.

In another embodiment, rather than providing compressed air 170 in response to a fault signal 148, controller 182 may proactively provide compressed air 170 to surface 143 of the lens 144 at a prescribed time interval (e.g., every "x" hours) or at an interval based on operating time of the gas turbine 100. Controller 182 may take into account the type of fuel being combusted by the combustors 110 in determining or adjusting the maintenance interval.

Figure 3:
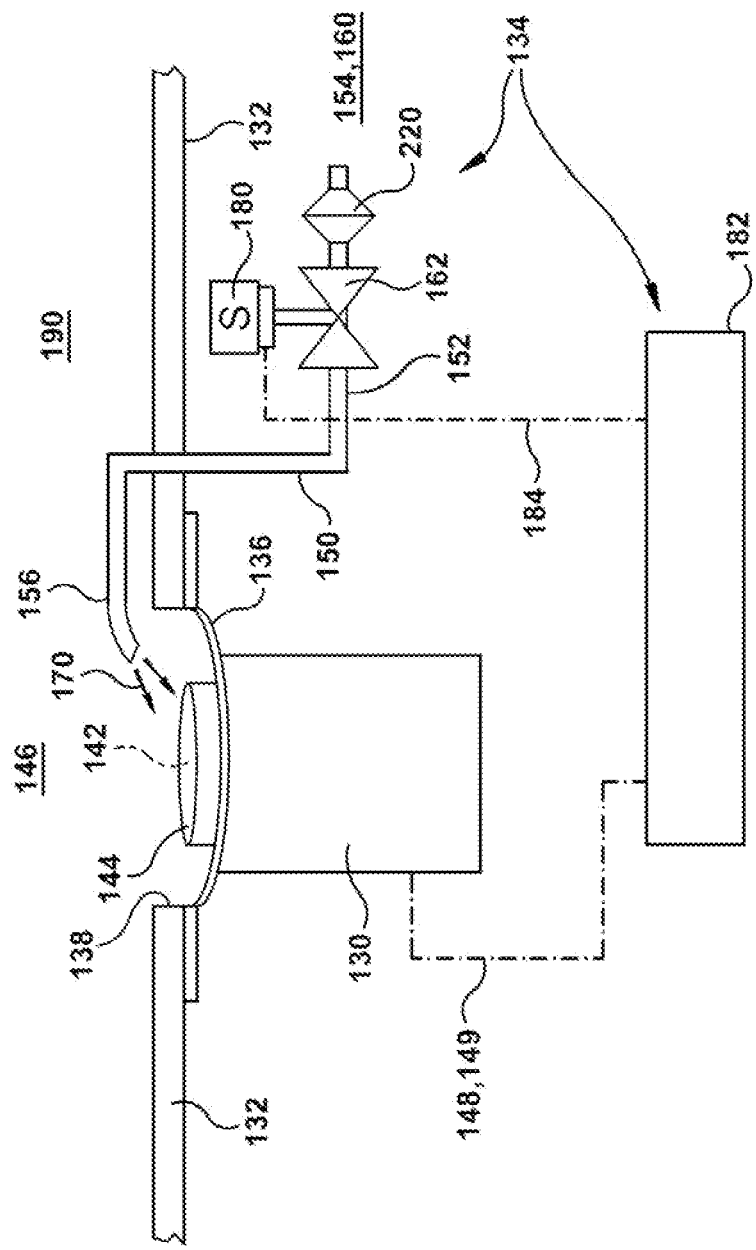
FIG. 3 shows a schematic view of a maintenance system for a flame detector, according to other embodiments of the disclosure.

Referring to FIG. 3, a schematic view of another embodiment of maintenance system 134 is illustrated. Here, source of air 160 includes ambient surroundings of enclosure 132, i.e., exterior 154 of enclosure 132. Enclosure 132 is ventilated by way of ventilation fan(s) 133 (FIG. 1) that pull air from enclosure 132 thereby creating a negative pressure 190 therein. Negative pressure 190 can create compressed air 170 from ambient air drawn into conduit 150 through solenoid valve 180. Controller 182 operates as described relative to FIG. 2.

Figure 4:
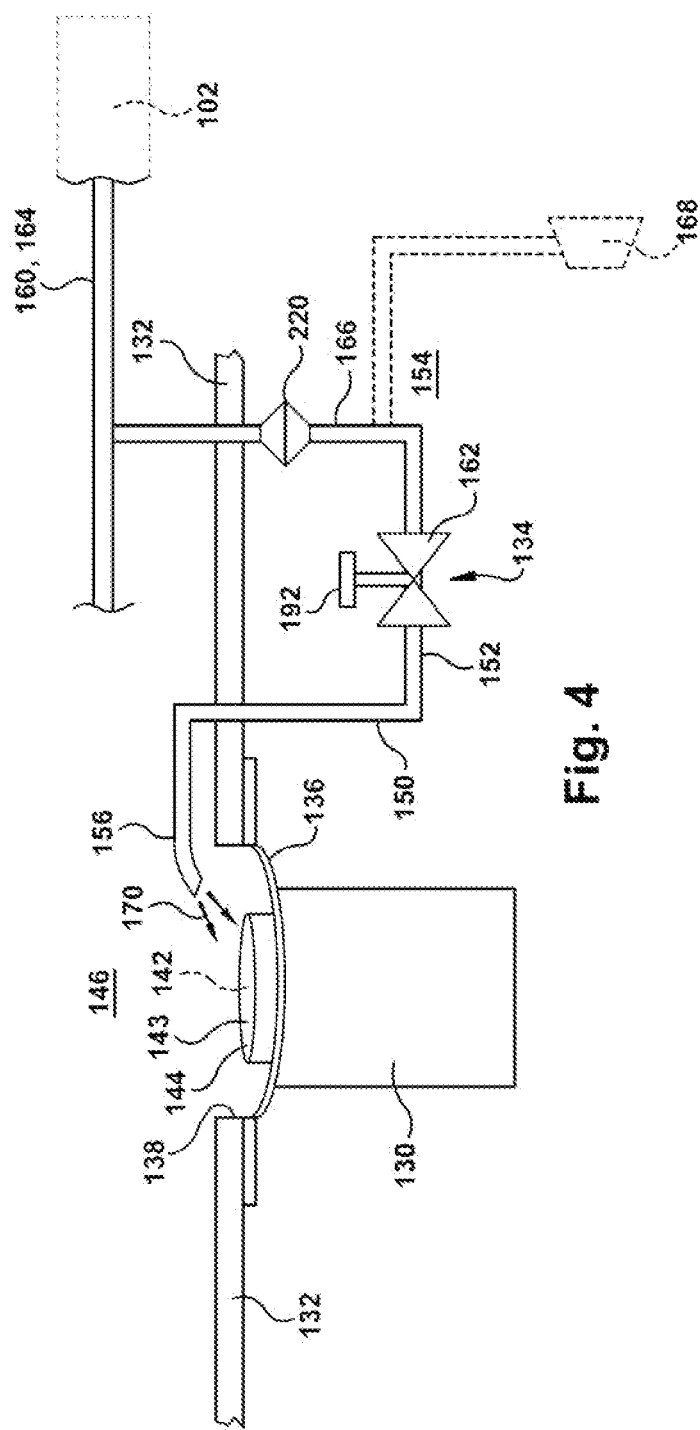
FIG. 4 shows a schematic view of a maintenance system for a flame detector, according to additional embodiments of the disclosure.

FIGS. 4 and 5 show schematic views of other embodiments of maintenance system 134. In FIGS. 4 and 5, solenoid valve 180 (FIGS. 2-3) has been replaced by a manually operable valve 192. Controller 182 is also removed. Manually operable valve 192 is accessible from exterior 154 of enclosure 132. In FIG. 4, source of air 160 includes air 164 from a compressor. In one example, the compressor may include compressor 102 (FIG. 1) of GT system 100 (FIG. 1). In another example, source of air 160 may include air 164 from an independent compressor 168 (shown in dashed lines). Independent compressor 168 may be inside or outside of enclosure 132. In any event, valve 192 is fluidly coupled to conduit 166 delivering air 164 from interior 146 (or exterior 154) of enclosure 132. Manually operable valve 192 is normally closed, preventing compressed air 170 from being directed onto surface 143. When a user determines cleaning or cooling is required, manually operable valve 192 may be opened for a period of time to clean or cool, e.g., surface(s) 143. In FIG. 5, source of air 160 includes ambient surroundings of enclosure 132, i.e., exterior 154. Here, enclosure 132 has negative pressure 190 therein to create compressed air 170 from ambient air drawn into conduit 150 through valve 192.

Referring to FIG. 6, in another embodiment, valve 162 can be replaced with a metering orifice 200 on inlet 152 of conduit 150. As noted, enclosure 132 has negative pressure 190 therein. Metering orifice 200 may be any now known or later developed device for allowing a controlled flow of air into inlet 152 of conduit 150 under the influence of negative pressure 190 in enclosure 132. Negative pressure 190 creates compressed air 170 from ambient air drawn into (and through) metering orifice 200. Compressed air 170 exits through outlet 156 of conduit 150 onto surface(s) 143 of flame detector 130, thereby removing contaminants 142 from surface(s) 143, and/or cooling surface(s) 143, other parts of flame detector 130, or both. The FIG. 6 embodiment works continuously.

Figure 7:
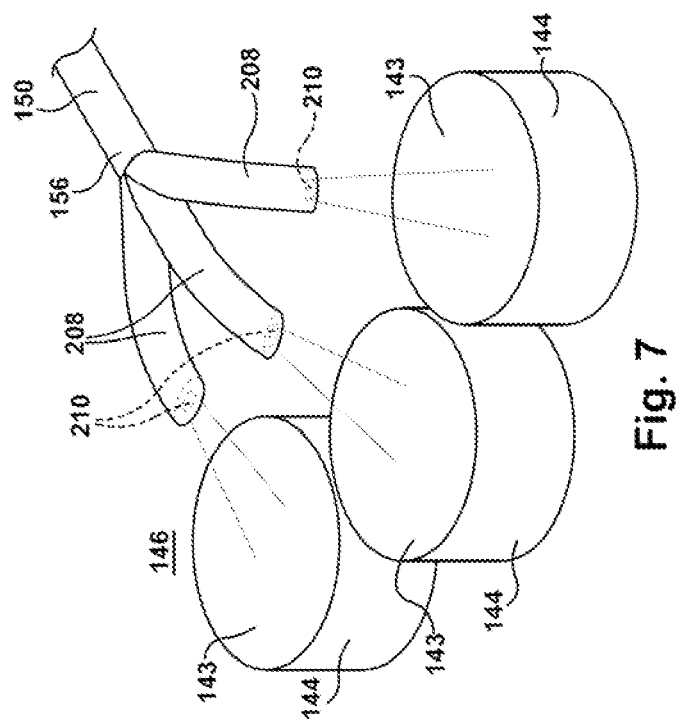
FIG. 7 shows a perspective view of an outlet of a maintenance system for a flame detector, according to optional embodiments of the disclosure.

It will be noted that compressed air 170 can be directed onto, toward, or across surface(s) 143 or other parts of flame detector 130 to remove contaminants 142 and/or cool flame detector 130. In one embodiment, as shown in FIG. 7, outlet 156 of conduit 150 may include any number of branches 208 to direct compressed air 170 at any number of locations. FIG. 7 also shows that outlet 156 and/or branches 208 thereof may optionally include at least one nozzle 210 thereon. Nozzle(s) 210 can include any now known or later developed air nozzles to direct compressed air 170 or further compress the air. Any number of nozzle(s) 210 can be used.

Figure 8:
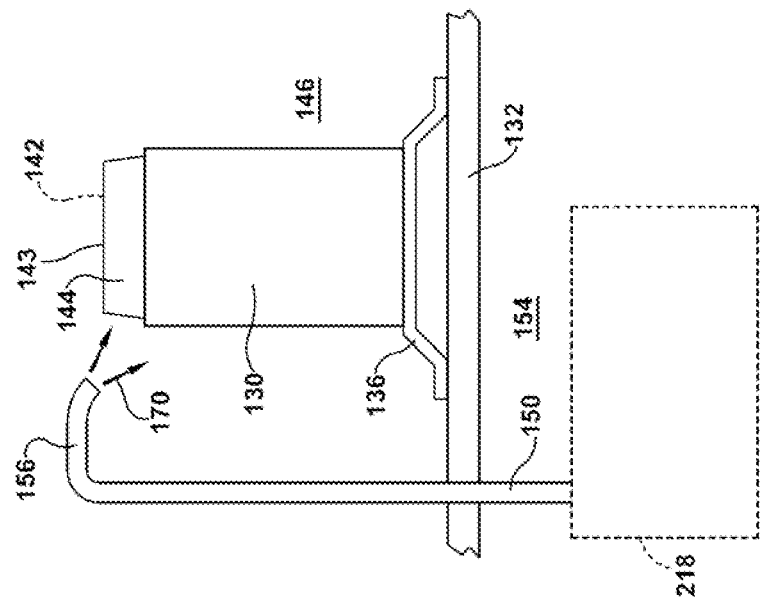
FIG. 8 shows a schematic view of a maintenance system for a flame detector, according to another embodiment of the disclosure.

In the previous embodiments, flame detector 130 was illustrated as outside enclosure 132 and looking through opening 138 (FIGS. 2-6) in enclosure 132. As noted, and as shown in FIG. 8, flame detector 130 may be mounted inside enclosure 132, for example, by a mounting system 136. The FIG. 8 embodiment may employ any of the previously described arrangements of maintenance system 134, which are collectively shown schematically by dashed box 218.

Conduits 150, 166 described herein can be any now known or later developed tubing, piping, ducts, etc., capable of delivering air and withstanding the environment in which employed. As an option, any conduit 150, 166 may include a filter 220 therein to filter air passing therethrough.

Embodiments of the disclosure provide a maintenance system for a flame detector that is easy to add to any GT system and easy to access from outside of the enclosure. The maintenance system can clean and/or cool parts of the flame detector.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

What is claimed is:

1. A maintenance system for a flame detector located on an enclosure of a turbomachine area, the maintenance system comprising:
   a first conduit having an inlet at an exterior of the enclosure and an outlet at an interior of the enclosure, the outlet adjacent the flame detector;
   a source of air, wherein the source of air includes instrument air from a compressor within the enclosure; and
   a valve fluidly coupled to the inlet of the first conduit and a second conduit, the second conduit being fluidly coupled to the source of air,
   wherein the valve is configured to deliver a compressed air from the source of air through the outlet of the first conduit onto a surface of the flame detector, thereby removing contaminants from the surface and/or cooling the surface.

2. The maintenance system of claim 1, wherein the valve includes a solenoid valve, and further comprising a controller operatively coupled to the flame detector and the solenoid valve, wherein the controller operates the solenoid valve to deliver the compressed air from the outlet of the first conduit onto the surface of the flame detector in response to a fault signal.

3. The maintenance system of claim 1, wherein the valve is a manually operable valve.

4. The maintenance system of claim 1, wherein the outlet of the first conduit includes at least one nozzle thereon.

5. The maintenance system of claim 1, wherein the valve is positioned at the exterior of the enclosure.

6. The maintenance system of claim 1, wherein the valve includes a solenoid valve, and further comprising a controller operatively coupled to the flame detector and the solenoid valve, wherein the controller operates the solenoid valve to deliver the compressed air from the outlet of the first conduit onto the surface of the flame detector at a prescribed time interval.

7. The maintenance system of claim 6, wherein the controller calculates the prescribed time interval based on a fuel type.

8. A system, comprising:
   a gas turbine (GT) system including: a compressor, a combustor assembly, and a gas turbine operatively coupled to the compressor and the combustor assembly, the combustor assembly and gas turbine each including a surrounding casing;
   an enclosure enclosing the GT system;
   a flame detector operatively coupled to the enclosure;
   a maintenance system for the flame detector, the maintenance system including:
      a first conduit having an inlet at an exterior of the enclosure and an outlet at an interior of the enclosure, the outlet adjacent the flame detector;
      a source of air; and
      a solenoid valve fluidly coupling the inlet of the first conduit and the source of air,
   wherein the solenoid valve is configured to deliver a compressed air from the source of air through the outlet of the first conduit onto a surface of the flame detector, thereby removing contaminants from the surface and/or cooling the surface; and
   a controller operatively coupled to the flame detector and the solenoid valve, wherein the controller operates the solenoid valve to deliver the compressed air from the outlet of the first conduit onto the surface of the flame detector at a prescribed time interval based on a fuel type.

9. The system of claim 8, wherein the controller operates the solenoid valve to deliver the compressed air from the outlet of the first conduit onto the surface of the flame detector in response to a fault signal.

10. The system of claim 9, wherein the source of air includes an instrument air from the compressor, and the solenoid valve is fluidly coupled to a second conduit delivering the instrument air from the interior of the enclosure.

11. The system of claim 9, wherein the source of air includes ambient surroundings of the enclosure, and wherein the enclosure has a negative pressure therein to create the compressed air from ambient air drawn into the first conduit through the solenoid valve.

12. The system of claim 8, wherein the source of air includes ambient surroundings of the enclosure, and wherein the enclosure has a negative pressure therein to create the compressed air from ambient air drawn into the first conduit through the solenoid valve.

13. The system of claim 8, wherein the outlet of the first conduit includes at least one nozzle thereon.

14. The system of claim 8, wherein the solenoid valve is positioned at the exterior of the enclosure.

15. The system of claim 8, wherein the source of air includes an instrument air from a plenum of combustors within the GT system, and the solenoid valve is fluidly coupled to a second conduit delivering the instrument air from the interior of the enclosure.

16. The system of claim 8, wherein the source of air includes an instrument air from a plenum of combustors within the GT system, and the solenoid valve is fluidly coupled to a second conduit delivering the instrument air from the interior of the enclosure.

17. A system, comprising:
   a gas turbine (GT) system including: a compressor, a combustor assembly, and a gas turbine operatively coupled to the compressor and the combustor assembly, the combustor assembly and gas turbine each including a surrounding casing;
   an enclosure enclosing the GT system;
   a flame detector operatively coupled to the enclosure; and
   a maintenance system for the flame detector, the maintenance system including:
      a first conduit having an inlet at an exterior of the enclosure and an outlet at an interior of the enclosure, the outlet adjacent the flame detector;
      a source of air, wherein the source of air includes instrument air from a compressor within the enclosure; and
      a valve fluidly coupling the inlet of the first conduit and a second conduit, the second conduit being fluidly coupled to the source of air,
   wherein the valve is configured to deliver a compressed air from the source of air through the outlet of the first conduit onto a surface of the flame detector, thereby removing contaminants from the surface and/or cooling the surface.

18. The system of claim 17, wherein the valve is a manually operable valve.

19. The system of claim 17, wherein the outlet of the first conduit includes at least one nozzle thereon.

20. The system of claim 17, wherein the valve includes a solenoid valve, and further comprising a controller operatively coupled to the flame detector and the solenoid valve, wherein the controller operates the solenoid valve to deliver the compressed air from the outlet of the first conduit onto the surface of the flame detector at a prescribed time interval.

* * * * *